US012647432B2

(12) United States Patent  
Tyagi et al.

(10) Patent No.: US 12,647,432 B2  
(45) Date of Patent: *Jun. 2, 2026

(54) QUANTIFICATION OF ADVERSARY TACTICS, TECHNIQUES, AND PROCEDURES USING THREAT ATTRIBUTE GROUPINGS AND CORRELATION

(71) Applicant: Qualys, Inc., Foster City, CA (US)

(72) Inventors: Ankur Sunil Tyagi, Foster City, CA (US); Mayuresh Vishwas Dani, Fremont, CA (US)

(73) Assignee: Qualys, Inc., Foster City, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/766,401

(22) Filed: Jul. 8, 2024

(65) Prior Publication Data

US 2024/0364715 A1 Oct. 31, 2024

Related U.S. Application Data

(63) Continuation of application No. 17/525,773, filed on Nov. 12, 2021, now Pat. No. 12,034,743.

(51) Int. Cl.  
*H04L 9/40* (2022.01)

(52) U.S. Cl.  
CPC ...... *H04L 63/1416* (2013.01); *H04L 63/1425* (2013.01); *H04L 63/1433* (2013.01); *H04L 63/1466* (2013.01); *H04L 63/20* (2013.01)

(58) Field of Classification Search  
CPC ............. H04L 63/1466; H04L 63/1433; H04L 63/1425; H04L 63/1416  
See application file for complete search history.

(56) References Cited

U.S. PATENT DOCUMENTS

| | | | |
|---|---|---|---|
| 10,958,686 B2 | 3/2021 | Dani et al. | |
| 10,965,709 B2 | 3/2021 | Dani et al. | |
| 10,965,712 B2 | 3/2021 | Dani et al. | |
| 2009/0007270 A1 | 1/2009 | Futoransky et al. | |
| 2012/0096555 A1 | 4/2012 | Mahaffey | |
| 2013/0227697 A1 | 8/2013 | Zandani | |
| 2013/0312101 A1 | 11/2013 | Lotem et al. | |
| 2016/0248805 A1 | 8/2016 | Burns et al. | |

(Continued)

OTHER PUBLICATIONS

The Mitre Corporation, ATT&CK Matrix, Defines commonly known adversarial behavior (TTPs), https://attack.mitre.org/, 2015.  
The Mitre Corporation, PRE-ATT&CK Matrix: Subset of ATT&CK Matrix focusing on TTPs related to steps taken "before" launching an attack, https://attack.mitre.org/matrices/pre/, 2015.

(Continued)

*Primary Examiner* — Rodman Alexander Mahmoudi  
(74) *Attorney, Agent, or Firm* — Baker & McKenzie LLP

(57) ABSTRACT

The present disclosure provides a method and a system for generating a decision tree that tests security event files. The method comprises receiving attack data comprising a plurality of attack execution operations and determining threat attribute data based on the attack data. The method also comprises generating a decision tree using the threat attribute data. The decision tree includes at least one first node and a plurality of second nodes connected to the at least one first node. A first nodal data may be generated and assigned to each second node based on one or more threat attributes associated with the threat attribute data. In response to receiving a security event file, the method executes one or more security tests, using the decision tree, for the security event file.

24 Claims, 5 Drawing Sheets

(56) References Cited

U.S. PATENT DOCUMENTS

| | | |
|---|---|---|
| 2016/0294854 A1 | 10/2016 | Parthasarathi et al. |
| 2017/0006055 A1 | 1/2017 | Strom et al. |
| 2017/0126712 A1 | 5/2017 | Crabtree et al. |
| 2019/0238583 A1* | 8/2019 | Vaidya ............... H04L 63/1433 |
| 2020/0327225 A1 | 10/2020 | Nguyen et al. |
| 2020/0329067 A1* | 10/2020 | Dani .................. H04L 63/1416 |
| 2020/0329070 A1 | 10/2020 | Dani et al. |
| 2020/0329071 A1 | 10/2020 | Dani et al. |
| 2021/0218767 A1 | 7/2021 | Dani et al. |
| 2021/0243230 A1 | 8/2021 | Dani et al. |
| 2022/0057519 A1* | 2/2022 | Goldstein .............. G01S 17/88 |
| 2023/0156017 A1 | 5/2023 | Tyagi et al. |

OTHER PUBLICATIONS

Azeria, Tactics, Techniques and Procedures (TTP), https://azeria-labs.com/tactics-techniques-and-procedures-ttps/, 2017.

Wikipedia, Tactics, Techniques and Procedures (TTP), https://en.wikipedia.org/wiki/Terrorist_Tactics,_Techniques,_and_Procedures, last updated Sep. 30, 2019.

Wikipedia, Cyber Kill Chain: Refers to sequence of tactics used by adversaries to achieve a goal. Multiple definitions from different sources but we are following ATT&CK Matrix as it is the most verbose, https://en.wikipedia.org/wiki/Kill_chain#The_Cyber_Kill_Chain, last updated on Sep. 30, 2019.

Wikipedia, The Unified Kill Chain: Refers to sequence of tactics used by adversaries to achieve a goal. Multiple definitions from different sources but we are following ATT&CK Matrix as it is the most verbose, https://en.wikipedia.org/wiki/Kill_chain#The_Unified_Kill_Chain, last updated on Sep. 30, 2019.

* cited by examiner

200

400

500

QUANTIFICATION OF ADVERSARY TACTICS, TECHNIQUES, AND PROCEDURES USING THREAT ATTRIBUTE GROUPINGS AND CORRELATION

CROSS-REFERENCE TO RELATED APPLICATIONS

This application claims priority to and is a continuation of U.S. patent application Ser. No. 17/525,773, filed Nov. 12, 2021, the disclosure of which is incorporated by reference in its entirety for all purposes.

TECHNICAL FIELD

The present disclosure relates to methods and systems for testing security event files using a decision tree. More specifically, the present disclosure describes generating a decision tree that is used to generate remediation data associated with mitigating against attack operations associated with the security event file.

BACKGROUND

A major challenge in the computer security industry is a lack of reliable computer security models that leverage information from multiple and disparate security reports, security events, and other scan data from diverse security systems to mitigate against computer security attacks. Such models, for example, may: analyze and more efficiently test security event files (e.g., from security reports, scan data, malware detection data, etc.); generate attack trends or attack kill-chains; recommend remediative steps against said attack kill-chains through remediation trend maps; prioritize remediative steps; etc. There is therefore a need for optimal models that can achieve these benefits.

SUMMARY

The present disclosure provides a method and a system for generating a decision tree that tests security event files. The method comprises receiving attack data comprising a plurality of attack execution operations and determining threat attribute data based on the attack data. The threat attribute data, according to some embodiments, comprises a first threat attribute associated with the plurality of attack execution operations, the first threat attribute comprising threat-actor data indicative of an attacker associated with at least one attack execution operation comprised in the plurality of attack execution operations. The threat attribute data may also comprise a second threat attribute associated with the plurality of attack execution operations, the second threat attribute indicative of malware data associated with the at least one attack execution operation comprised in the plurality of attack execution operations. In some embodiments, the threat attribute data comprises a third threat attribute associated with the plurality of attack execution operations, the third threat attribute indicative of security tool data associated with the at least one attack execution operation comprised in the plurality of attack execution operations. The threat attribute data may also comprise a fourth threat attribute associated with the plurality of attack execution operations, the fourth threat attribute comprising user data associated with the at least one attack execution operation comprised in the plurality of attack execution operations. In other embodiments, the threat attribute data includes a fifth threat attribute associated with the plurality of attack execution operations, the fifth threat attribute comprising location data associated with an attack execution operation comprised in the plurality of attack execution operations. The threat attribute data may also comprise a sixth threat attribute associated with the plurality of attack execution operations, the sixth threat attribute comprising operating system data associated with executing at least one attack execution operation comprised in the plurality of attack execution operations. The method may also comprise generating a decision tree using the threat attribute data, the decision tree including at least one first node and a plurality of second nodes connected to the at least one first node. A first nodal data may be generated and assigned to each second node based on at least one of the first threat attribute, the second threat attribute, the third threat attribute, the fourth threat attribute, the fifth threat attribute, or the sixth threat attribute. In response to receiving a security event file, the method may comprise executing one or more security tests, using the decision tree, for the security event file.

Other implementations of one or more of these aspects include corresponding systems, apparatus, and computer programs, configured to perform the actions of the methods, encoded on computer storage devices.

These and other implementations may each optionally include one or more of the following features. The security event file may comprise at least one attack type, such that executing one or more security tests for the security event file using the decision tree comprises: determining a risk value to assign the security event file, assigning the risk value to the security event file, and prioritizing one or more remediation operations against the at least one attack type.

In one embodiment, the first nodal data comprises a first score assigned to a first leaf node comprised in the plurality of second nodes of the decision tree, such that the first score includes a combination of: a second score associated with a second leaf node comprised in the plurality of second nodes of the decision tree, and a third score associated with a third leaf node comprised in the plurality of second nodes of the decision tree.

The threat attribute data may further comprise one or more of: a seventh threat attribute associated with the plurality of attack execution operations, the seventh threat attribute comprising application package data indicative of package-access information associated with executing at least one attack execution operation comprised in the plurality of attack execution operations; an eighth threat attribute associated with the plurality of attack execution operations, the eighth threat attribute comprising sub-operation data associated with executing at least one sub-attack execution operation associated with at least one attack execution operation comprised in the plurality of attack execution operations; and a ninth threat attribute associated with the plurality of attack execution operations, the ninth threat attribute comprising remediation data associated with mitigating against at least one attack execution operation comprised in the plurality of attack execution operations.

In some cases, the threat attribute data is used to automatically structure one or more parent nodes and child nodes of the decision tree. Furthermore, the attack data comprises one or more of: a framework based on an attack repository; the attack repository comprising one or more of the attacker or one or more attackers associated with the plurality of attack execution operations; attack data captured from multiple computing devices associated with multiple entities; and one or more resources associated with the multiple computing devices.

Furthermore, the malware data may comprises a group of malware samples that have a common code base. The user data may comprise user credential data or administrator credential data. The location data may comprise data that indicates whether at least one attack execution operation was locally executed or remotely executed relative to a location of the multiple computing devices.

Moreover, the first nodal data is based on a grouping of a plurality of threat attributes correlated to threat tactics, threat techniques, or threat procedures associated with the framework. In addition, the decision tree may automatically balance threat attributes across different tactics associated with the framework to generate an attack kill-chain associated with the security event file. The attack kill-chain may indicate one or more attack execution operations for executing an attack campaign such that the one or more security tests using the decision tree generates remediation data comprising security operations that mitigate against the attack kill-chain.

In some embodiments, the decision tree maps threat tactics, threat techniques, and threat practices associated with the framework to one or more scores assigned to one or more nodes of the decision tree.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

DETAILED DESCRIPTION

Figure 1:
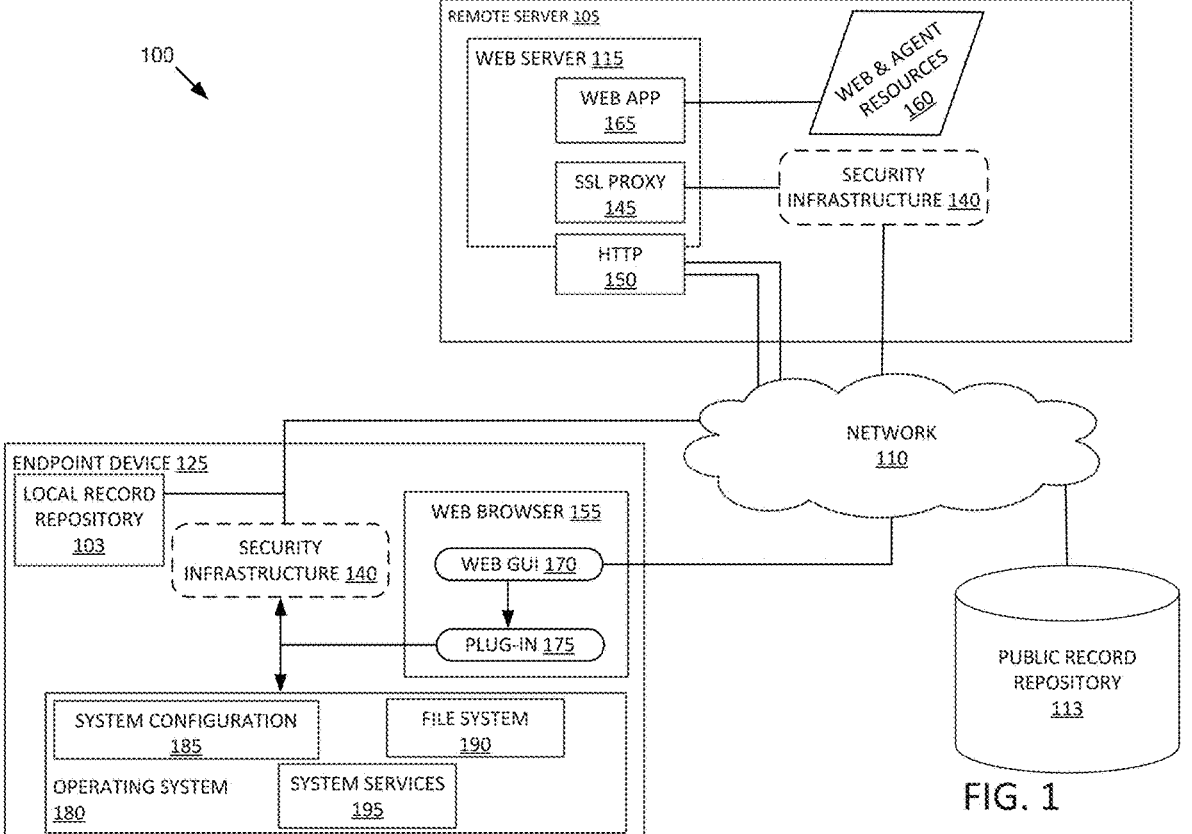
FIG. 1 shows an exemplary system for generating a decision tree that is used to test security event files, in accordance with some embodiments of this disclosure.

Most computer security systems require accurate or substantially accurate models for optimal detection and remediating against computer security breaches. For example, models that accurately quantify adversary tactics, techniques, and procedures (TTPs) using threat attributes and subsequent resulting analysis from correlating such TTPs to actual numerical values can quickly help in detecting threat-actor (e.g., hacker) activity and/or provide recommendations, and/or prioritization of remediative operations against attack operations of threat-actors. In some cases, such models can be used to quantitatively qualify the severity of TTPs using attribution and/or grouping criteria inherent in security events that have been aggregated over a period of time from multiple computing devices and/or from multiple similar or dissimilar entities. Leveraging data from the foregoing aggregated security data can automatically balance or otherwise normalize threat attributes across multiple, and in some cases, different TTPs associated with an adversary/threat actor kill-chain (e.g., one or more attack execution operations that comprise an attack campaign). This can help prioritize remediative operations within a set of operations that mitigate against the adversary kill-chain and/or enhance high fidelity detections of threat-actor activity as logged within a security event file.

According to one aspect of the present disclosure, a decision tree model is used to structure a plurality of threat attributes with specific numeric scores that map to corresponding TTPs. The decision tree model (or simply, decision tree) may be used to test security event files that may include one or more attack execution operations associated with an attack campaign executed by a threat-actor. An attack campaign could comprise a collection of TTPs used to execute an attack on a computing system. In one embodiment, tactics used to execute an attack campaign comprise a plurality of techniques that are aligned to a particular phase within the attack campaign. Moreover, a technique used in an attack campaign could include an action that a threat-actor performs to achieve a specific goal.

In the computer security space, threat-actors or adversaries such as Advanced Persistent Threat (APT) groups and/or other hackers generally execute attack execution operations for myriad reasons when attacking computing devices and/or resources associated with a computing device. Attack execution operations could comprise one or more TTPs and/or practices used by a threat-actor to execute an attack campaign. As part of executing attack execution operations, threat-actors may seek vulnerabilities on computing devices, hold computing devices hostage via denial of service attacks, seek backdoor channels into computing devices to bypass normal authentication protocols, compromise computing devices using worms and keyloggers, eavesdrop, phish and spoof to obtain data, etc. Because of this, individuals and organizations generally have some form of computer security infrastructure that deal with threats posed by threat-actor activities.

Usually, most users adopt computer security infrastructure that combine many security features associated with one or more computer security products. The techniques disclosed herein facilitate leveraging data generated from one or more security features associated computer security products in a manner that provides a holistic or complete view into the content and context of an attack campaign executed against a computing system. More specifically, the techniques described herein advantageously facilitate mapping attack events associated with an attack campaign across a multitude of security products to security data from one or more attack repositories to generate a decision tree. The decision tree may include multiple nodes such that some of the nodes have assigned scores or values that map to specific TTPs. The decision tree may be used to test security event files as further discussed below.

The techniques provided herein provide insight into how an attack campaign was executed. In particular, the techniques discussed in this disclosure allows quantifying vulnerabilities derived from attack data including a plurality of TTPs to provide automatic adaptation of remediation strategies that appropriately account for, and remediate against, a given attack campaign and/or attack steps comprised in a security event file.

System Environment

Illustrated in FIG. 1 is a high level diagram of an exemplary system 100 for executing the principles disclosed. In the illustrated implementation, the system 100 may include a remote server 105 coupled to a network 110. The system 100 may also include an endpoint device 125 and a public record repository 113 communicatively coupled via the network 110. While a single remote server 105 and a single endpoint device 125 are illustrated, the disclosed principles and techniques could be expanded to include multiple remote servers, multiple endpoints, and multiple public record repositories.

In some embodiments, the remote server 105 may include a computing device such as a mainframe server, a content server, a communication server, a laptop computer, a desktop computer, a handheld computing device, a smart phone, a wearable computing device, a tablet computing device, a virtual machine, a cloud-based computing solution and/or a cloud-based service, and/or the like. The remote server 105 may include a plurality of computing devices configured to communicate with one another and/or implement the techniques described herein.

Figure 2:
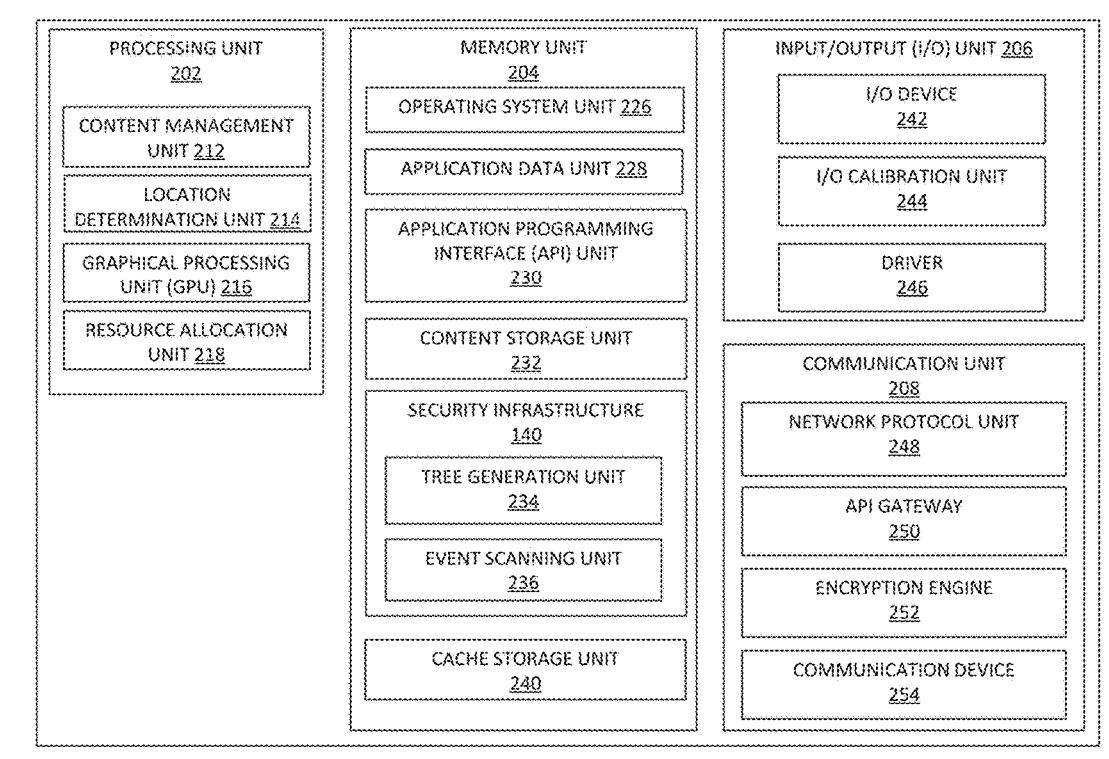
FIG. 2 is a functional block diagram of a computing environment for generating and/or testing security event files, in accordance with some embodiments of this disclosure.
Figure 3:
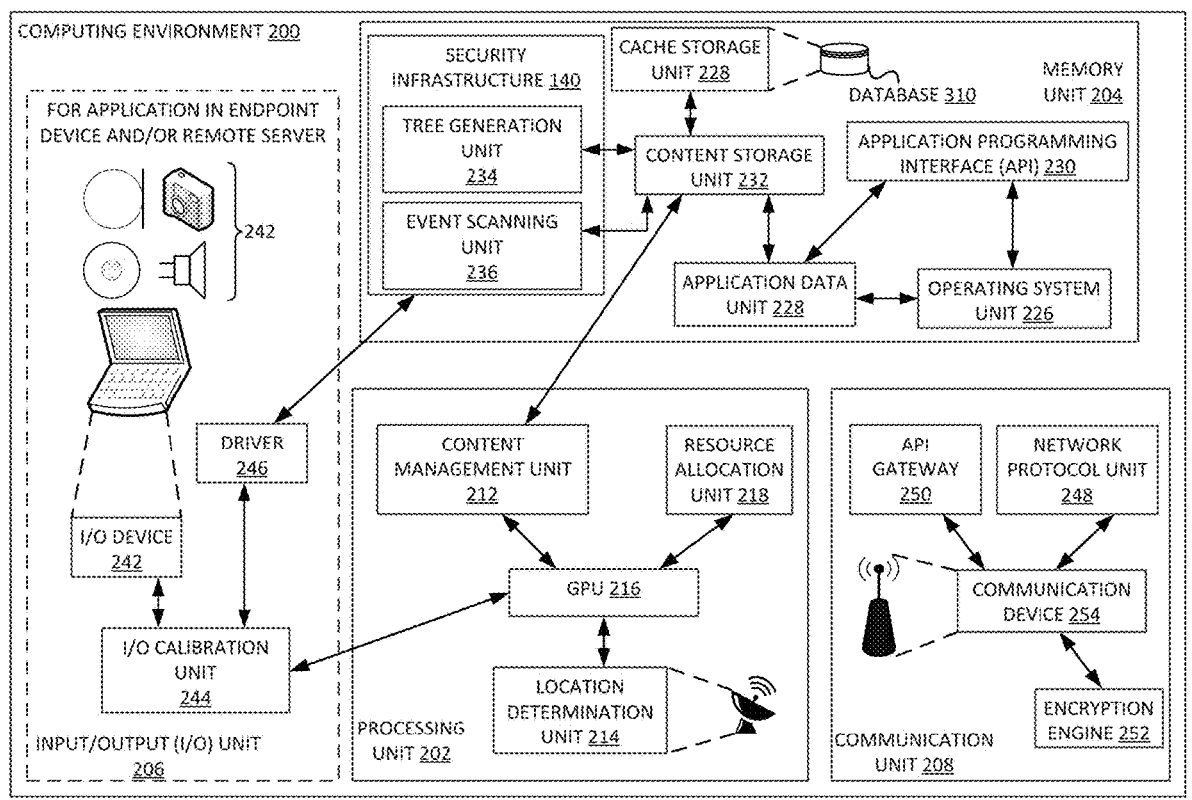
FIG. 3 is a detailed system diagram of the computing environment of FIG. 2, in accordance with some embodiments of this disclosure.

The remote server 105 may include various elements of a computing environment as described in association with the computing environment 200 of FIG. 2 and/or FIG. 3. For example, the remote server 105 may include processing unit 202, a memory unit 204, an input/output (I/O) unit 206, and/or a communication unit 208. The remote server 105 may further include subunits and/or other modules as for performing operations associated with malware detection and/or remediation. A user such as network administrator and/or computer security engineer may operate the remote server 105 either locally or remotely.

Further, the remote server 105 may include a web server 115, security infrastructure 140, and a web and agent resources 160. The web server 115, the security infrastructure 140 and the web and agent resources 160 are coupled to each other and to the network 110 via one or more signal lines. The one or more signal lines may be a wired and/or wireless connection.

The web server 115 may include a secure socket layer (SSL) proxy 145 for establishing HTTP-based connectivity 150 between the remote server 105 and other devices or systems coupled to the network 110. Other forms of secure connection techniques, such as encryption, may be employed on the web server 115 and across other systems coupled to the network 110. Additionally, the web server 115 may deliver artifacts (e.g., binary code, instructions, data, etc.) to the security infrastructure 140 either directly via the SSL proxy 145 and/or via the network 110. Additionally, the web and agent resources 160 of the remote server 105 may be provided to the endpoint device 125 via the web app 165 on the web server 115. The web and agent resources 160 may be used to render a web-based graphical interface (GUI) 170 via the browser 155 running on the endpoint device 125.

The security infrastructure 140 may either be on the remote server 105 and/or on the endpoint device 125. Security infrastructure 140 may include one or more computer security products such as access control software, anti-keyloggers, anti-malware, anti-spyware, anti-subversion software, anti-tamper software, antivirus software, cryptographic software, computer-aided dispatch (CAD), Firewall (web or otherwise), Intrusion detection systems (IDS), Intrusion prevention systems (IPS), log management software, records management software, Sandboxes (e.g., a secure environment in which various computing processes may be executed), security information management software, security information and event management (SIEM) software, anti-theft software, parental control software, cloud-based security protection, and/or the like.

In some embodiments, security infrastructure 140 can determines whether scan data is indicative of malware and whether a report indicating that the endpoint device 125, or some other device coupled to the network 110 has been exposed to risks associated with malware. According to some embodiments, the report may comprise a security event file that includes a plurality of similar and/or dissimilar attack execution operations associated with an attack campaign. In other embodiments, the security event file may include one or more attack steps that may or may not be associated with an attack campaign. The security event file may include a listing of identified TTPs, threat attributes, a count of identified threat attributes, a type of each identified threat attribute, an identification of each malware family (e.g., a group of malware samples that have a common code base) and/or malware variant determined to be associated with the endpoint device 125, and/or associated with another system coupled to the network 110. The security event file may be stored on the local record repository 103 and/or on the public record repository 113 as the case may be.

The security infrastructure 140 may be configured to execute security operations including preparedness operations such as processes for dealing with security events/incidents/breaches/compromises; detection and analysis operations such as identifying and investigating suspicious activity associated with security events; containment, eradication, and recovery operations including determining the nature of a security event; and post-incident activity.

In some embodiments, the security infrastructure 140 may access an operating system 180 of the endpoint device 125 in order to execute security operations. For instance, the security infrastructure 140 may gain access into the operating system 180 in order to scan a security posture of the endpoint device 125 by scanning a system configuration 185, a file system 190, and/or system services 195 of the endpoint device 125. The plug-in 175 of the web browser 155 may provide needed downloads that facilitate operations executed by the operating system 180, the security infrastructure 140, and/or other applications running on the endpoint device 125.

The network 110 may include a plurality of networks. For instance, the network 110 may include any wired and/or wireless communication network that facilitates communication between the remote server 105, the public record repository 113, and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Returning to FIG. 1, the public record repository 113 may be one or more storage devices that store data, information and instructions used by the remote server 105 and/or the endpoint device 125. The stored information may include information about users, information about threat-actors or adversaries, information about TTPs and other malicious practices by threat-actors to execute an attack steps associated with an attack campaign. In one embodiment, the computer security information may be captured from computing devices from multiple different organizations and stored in the public record repository 113. In other embodiments, the computer security information stored in the public record repository 113 may be structured into a framework based on real-world observations of attacks on computing devices/systems across the globe. In some instances, this framework can provide comprehensive methods that assess tools/resources/components used by threat-actors to execute an attack campaign on a computing system. Additionally, the framework could also enable mapping security events detected on computing devices to numeric values or scores on a decision tree that correspond to a combination of TTPs within the public record repository 113. This can be used to test attack steps comprised in a security event file in order to determine appropriate remediation steps. In some implementations, testing a security event file may facilitate determining TTPs comprised within the security event file, processes used by threat-actors to hide their attacks, methodologies used by threat-actors to stage their exploits, practices used by threat-actors to evade detection, weaknesses associated with a computing system that are leveraged by threat-actors, etc. The framework discussed above, in some instances, includes the MITRE ATT&CK framework where attacks are classified into discreet units to facilitate recognizing patterns associated with one or more attack steps or attack execution operations associated with an attack campaign.

The one or more storage devices mentioned above in association with the public record repository 113 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis.

While the public record repository 113 is shown as coupled to the remote server 105 and the endpoint device 125 via the network 110, the data in the public record repository 113 may be replicated, in some embodiments, on the remote server 105 and/or the endpoint device 125. That is to say that a local copy of the data in the public record repository 113 may be stored on the remote server 105 and/or the endpoint device 125. This local copy may be synched with the public record repository 113 so that when there are any changes to the information in the public record repository 113, the local copy is also accordingly updated in real-time or in near-real-time to be consistent with the information in the public record repository 113.

Turning back to FIG. 1, the endpoint device 125 may be a handheld computing device, a smart phone, a tablet, a laptop computer, a desktop computer, a personal digital assistant (PDA), a smart device, a wearable device, a bio-metric device, a computer server, a virtual server, a virtual machine, and/or a communication server. In some embodiments, the endpoint device 125 may include a plurality of computing devices configured to communicate with one another and/or implement the techniques described in this disclosure. It is appreciated that according to some implementations, security event files (comprising one or more attack execution operations) may be generated by the security infrastructure 140 of the endpoint device 125 while the security infrastructure 140 of the remote server 105 may generate a decision tree used to subsequently test the security event file. In other embodiments, the security infrastructure 140 of the endpoint device 125 may also generate the decision tree used to test the security event file generated on the endpoint device 125.

The local record repository 103, shown in association with the endpoint device 125, may include one or more storage devices that store data, information, and instructions used by the endpoint device 125 and/or other devices coupled to the network 110. The stored information may include various logs/records or security event files associated with captured security data/security events by the security infrastructure 140. For example, the various reports, logs, data, security event files, etc., generated by the one or more security products of the security infrastructure 140 may be stored in the local record repository.

The one or more storage devices discussed above in association with the local record repository 103 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 125 are discussed in association with the computing environment 200 of FIG. 2 and/or FIG. 3. For example, elements such as a processing unit 202, a memory unit 204, an input/output (I/O) unit 206, and/or a communication unit 208 may execute one or more of the modules of endpoint device 125 and/or one or more elements of the remote server 105 shown in FIG. 1. The endpoint device 125 may also include subunits and/or other computing instances as provided in this disclosure for performing operations associated with malware detection, and/or malware remediation.

FIGS. 2 and 3 illustrate exemplary functional and system diagrams of a computing environment 200, according to some embodiments of this disclosure, for generating and using a decision tree for threat analysis. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically-purposed hardware as the case may be.

Importantly, the computing environment 200 and any units and/or subunits of FIGS. 2 and/or 3 may be included in one or more elements of system 100 as described in association with FIG. 1. For example, one or more elements (e.g., units and/or subunits) of the computing environment 200 may be included in the remote server 105 and/or the endpoint device 125.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIG. 2 and/or FIG. 3 alone and/or by the processing unit 202 in conjunction with one or more additional processors, units, subunits, elements, components, devices, and/or the like. Further, while one processing unit 202 may be shown in FIG. 2 and/or FIG. 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, security event file content, media content, malware content, or any combination thereof. In some instances, content on which the content management unit 212 may operate includes device information, user interface data, images, text, themes, audio files, video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., scanning instructions, scan data, security event data, and/or the like) described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel. In some implementations, the GPU 216 may be used in conjunction with the tree generation unit 234, the event scanning unit 236, and/or other subunits associated with the memory unit 204, the I/O unit 206, the communication unit 208, and/or a combination thereof.

The resource allocation unit 218 may facilitate the determination, monitoring, analysis, and/or allocation of computing resources throughout the computing environment 200 and/or other computing environments. For example, the computing environment may facilitate a high volume of data (e.g., files, malware, malware variants, etc.), to be processed and analyzed. As such, computing resources of the computing environment 200 utilized by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may utilize computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be utilized for storing, recalling, receiving, transmitting, and/or accessing various files and/or data (e.g., malware files, malware samples, scan data, and/or the like) during operation of computing environment 200. For example, memory unit 204 may be used for storing, recalling, and/or updating scan history information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be used and/or accessed by memory unit 204. In some embodiments, memory unit 204 and/or its subunits may be local to the remote server 105 and/or the endpoint device 125 and/or remotely located in relation to the remote server 105 and/or the endpoint device 125.

Turning back to FIG. 2, the memory unit 204 may include subunits such as an operating system unit 226, an application data unit 228, an application programming interface (API) unit 230, a content storage unit 232, security infrastructure 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include one or more modules such as a tree generation unit 234 and an event scanning unit 236 which are discussed in association with FIGS. 4 and 5.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by computing environment 200 and/or any other computing environment described herein. For example, the endpoint device 125 may be required to download, install, access, and/or otherwise utilize a software application (e.g., web application 165) to facilitate performance of malware scanning operations and/or kill chain graph generation and/or asset remediation trend map generation as described herein. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the remote server 105 and the endpoint device 125 to communicate with each other.

The content storage unit 232 may facilitate deployment, storage, access, and/or utilization of information associated with performance of malware scanning operations and/or framework processes by computing environment 200 and/or any other computing environment described herein. In some embodiments, content storage unit 232 may communicate with content management unit 212 to receive and/or transmit content files (e.g., media content).

Security infrastructure 140 may include at least a tree generation unit and an event scanning unit 236. According to some implementations, the security infrastructure may also include a threat detection unit (not shown) and/or a scan history unit (not shown). The tree generation unit 234 may store instructions associated with one or more security products of security infrastructure 140 that facilitate the generation of decision trees for testing security event files. These aspects are further discussed in association with FIGS. 4 and 5.

The event scanning unit 236 may be used in conjunction with the threat detection unit (not shown) and may store instructions associated with access control software, anti-keyloggers, anti-malware, anti-spyware, anti-subversion software, anti-tamper software, antivirus software, crypto-graphic software, computer-aided dispatch (CAD), Firewall (web or otherwise), Intrusion detection systems (IDS), Intrusion prevention systems (IPS), log management software, records management software, Sandboxes (e.g., a secure environment in which various computing processes may be executed), security information management, security information and event management (SIEM) software, anti-theft software, parental control software, cloud-based security protection, and/or the like. It is appreciated that the event scanning unit may generate one or more security reports or security event files that include one or more attack steps executed by a threat-actor, one or more attack steps associated with an attack campaign launched by a threat actor, etc.

Moreover, the event scanning unit 236 may also be used in conjunction with the scan history unit (not shown) to facilitate deployment, storage, access, analysis, and/or utilization of scan data, and/or security event data comprised in a security event file, and/or other received data resulting from scanning or executing some other security operation on the endpoint device 125. For example, the event scanning unit 236 may store instructions associated with each operation that involves file scanning, malware file execution, malware detection, security event file generation, and/or the other operations executed by security products of security infrastructure 140. Information stored in tree generation unit 234 and event scanning unit 236 may be used by the content management unit 212, GPU 216, threat detection unit, and/or other units and/or subunits of computing environment 200. It is appreciated that information generated by or associated with the tree generation unit 234 and/or event scanning unit 236 may be stored in the local record repository 103 and/or the public record repository 113 of FIG. 1.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing malware scanning operations, tree generation operations, security event file testing, and/or other processes as described herein. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touch-screen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with malware scanning, detection, displaying visual representations of attack steps used in attack campaigns associated with the malware scanning and detections, displaying visual representations of remediation strategies against an attack campaign, and other operations described herein.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may utilize a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the malware scanning operations and/or framework processes described herein.

The communication n unit 208 may facilitate establishment, maintenance, monitoring, and/or termination of communications between computing environment 200 and other computing environments, third party server systems, and/or the like (e.g., between the remote server 105 and the endpoint device 125). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access API unit 230 of memory unit 204 of computing environment 200. For example, an endpoint device 125 may access API unit 230 of computing environment 200 via API gateway 250. In some embodiments, API gateway 250 may be required to validate user credentials associated with a user of an endpoint device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Decision Tree Generation

Figure 4:
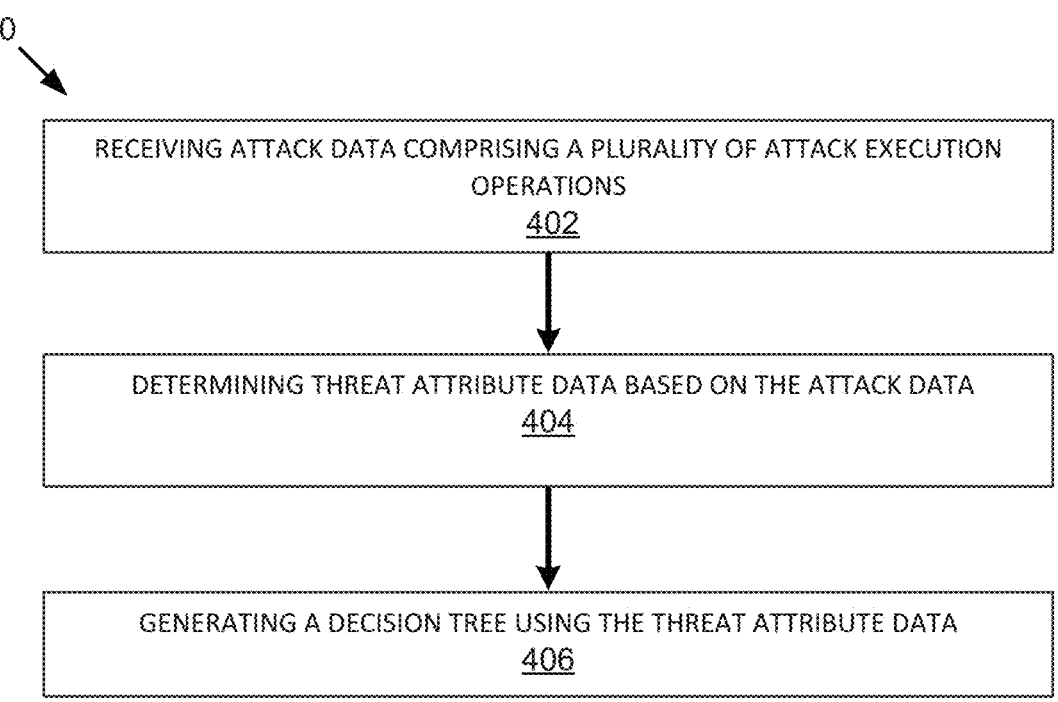
FIG. 4 shows an example flowchart for generating a decision tree for testing security event files, in accordance with some embodiments of this disclosure.

FIG. 4 shows an example flowchart for generating a decision tree for testing security event files. The method comprises receiving, at 402, attack data comprising a plurality of attack execution operations. At 404, threat attribute data may be determined based on the attack data. The threat attribute data may comprise data associated with a plurality of threat attributes. For example, the threat attribute data may comprise a first threat attribute associated with the plurality of attack execution operations comprised in the attack data. The first threat attribute data may comprise threat-actor data indicative of an attacker associated with at least one attack execution operation comprised in the plurality of attack execution operations. The threat attribute data may also comprise a second threat attribute associated with the plurality of attack execution operations. The second threat attribute may be indicative of malware data associated with at least one attack execution operation comprised in the aforementioned plurality of attack execution operations. In some embodiments, the threat attribute data comprises a third threat attribute associated with the plurality of attack execution operations. The third threat attribute may be indicative of security tool data associated with the at least one attack execution operation comprised in the plurality of attack execution operations. The threat attribute data may also comprise a fourth threat attribute associated with the plurality of attack execution operations. The fourth threat attribute may comprise user data associated with at least one attack execution operation comprised in the plurality of attack execution operations. In other embodiments, the threat attribute data includes a fifth threat attribute associated with the plurality of attack execution operations. The fifth threat attribute may comprise location data associated with an attack execution operation comprised in the plurality of attack execution operations. The threat attribute data may also comprise a sixth threat attribute associated with the plurality of attack execution operations. The sixth threat attribute may comprise operating system data associated with executing at least one attack execution operation comprised in the plurality of attack execution operations.

Figure 6:
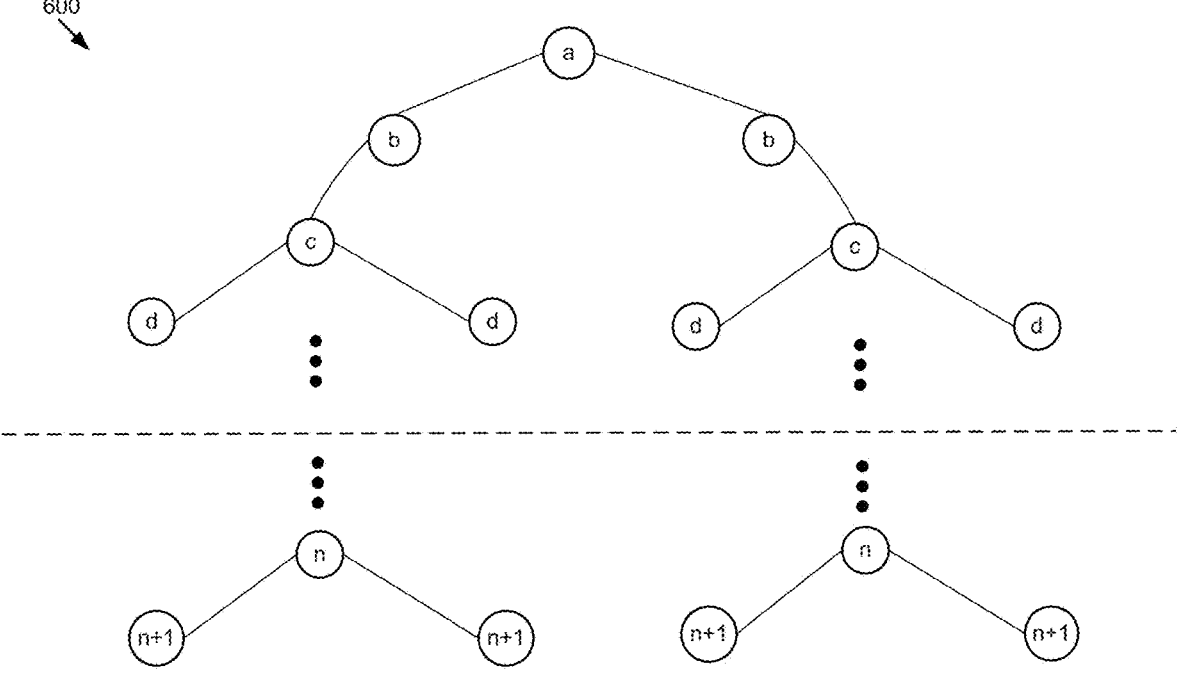
FIG. 6 shows an exemplary decision tree for testing security event files, in accordance with one embodiment of this disclosure.

At 406, the method may generate a decision tree using the threat attribute data. The decision tree may include at least one first node and a plurality of second nodes connected to the at least one first node. For example, and as shown in FIG. 6, the decision tree 600 may include a first node (e.g., node "a") and a plurality of second nodes (e.g., node "b" to node "(n+1)" where n is a positive integer). A first nodal data may be generated and assigned to each second node based on at least one of the first threat attribute, the second threat attribute, the third threat attribute, the fourth threat attribute, the fifth threat attribute, or the sixth threat attribute. In response to receiving a security event file, the method may comprise executing one or more security tests, using the decision tree, for the security event file. It is appreciated that the operations discussed in association with steps 402-406 may be executed by at least the tree generation unit 234 discussed in association with FIGS. 2 and 3.

According to some implementations, the decision tree models or otherwise "consumes" threat attribute data such as TTPs from a repository (e.g., local record repository 103 and/or public record repository 113) that stores multiple threat attribute data from a plurality of sources including intelligent sources and/or unintelligent sources associated multiple computing devices from multiple similar or dissimilar entities. Intelligent sources may include sources that use artificial intelligence (AI) or machine learning (ML) techniques in threat detection, threat attribute classification, and/or threat attribute analysis. For example, intelligent sources may include a data security framework such as the MITRE ATT&CK framework. Unintelligent sources may include systems that may not use AI or ML techniques in threat detection, threat attribute classification, and/or threat attribute analysis. In one embodiment, scores may be computed for each threat attribute identified or retrieved from the intelligent and/or unintelligent sources. By way of an example, a score may be generated based on the following attributes:

(i) used_by_groups: The technique is used by 1 or more threat actor groups;

(ii) used_by_malware: The technique is leveraged by 1 or more malware families;

(iii) used_by_tools: The technique is used by 1 or more security tools;

(iv) needs_user_permissions: The technique requires user-level privileges to execute;

(v) needs_remote_support: The technique can be executed remotely on a target system;

(vi) needs_administrator_permissions: The technique requires administrator-level privileges to execute;

(vii) needs_system_permissions: The technique requires Windows SYSTEM privileges to execute;

(viii) needs_root_permissions: The technique requires *nix root user privileges to execute;

(ix) has_subtechniques: The technique has 1 or more sub-techniques;

(x) lacks_mitigations: The technique lacks mitigation or remediation actions.

As seen above, each malware attribute may be given an identifier that names the attribute in question. For example, the first threat attribute "[t]he technique is used by 1 or more threat actor groups has the identifier "used_by_groups." Similarly, the second attribute is identified by "used_by-_malware," and so forth.

Based on the above threat attributes (and also other threat attributes that are not listed above), nodal data may be generated for each first node and second node of the decision tree. Nodal data may include a score (e.g., numerical value) associated with a specific attribute at a given node of the decision tree. The score for each node of a given decision tree may range from 0-10 with resolution of about 0.2 or 0.3 or 0.4 or 0.5, for example. In some cases, the score of the each node of the decision tree may range from 0-10, or from 0-20, or from 0-30, or from 0-40, or from 0-50, or from 0-60, or from 0-70, or from 0-80, or from 0-90, or from 0-100. It is appreciated that the decision tree can dynamically expand based on the amount of applicable threat attributes associated with the attack data.

In one embodiment, moving from a first node (e.g., node "a" in FIG. 6) to a second node (e.g., nodes "b", "c", "d", etc.), may comprise increasing the score of the second node relative to the score of first node or reducing a score of the second node relative to the score of the first node. These increases or reductions of the score of the second node relative to the score of the first node may be based on the type of threat attribute assigned to the second node. It is appreciated that the first node, and/or the plurality of second nodes may be associated with specific threat attributes and inter-relate to each other. For example, a first second node "c" (see FIG. 6) may comprise a threat attribute that is a subset of a threat attribute comprised in associated with the second node "b." In another example, the first second node "c" may refer to a threat attribute that further clarifies one or more attack execution operations associated with the second node "b".

Figure 5:
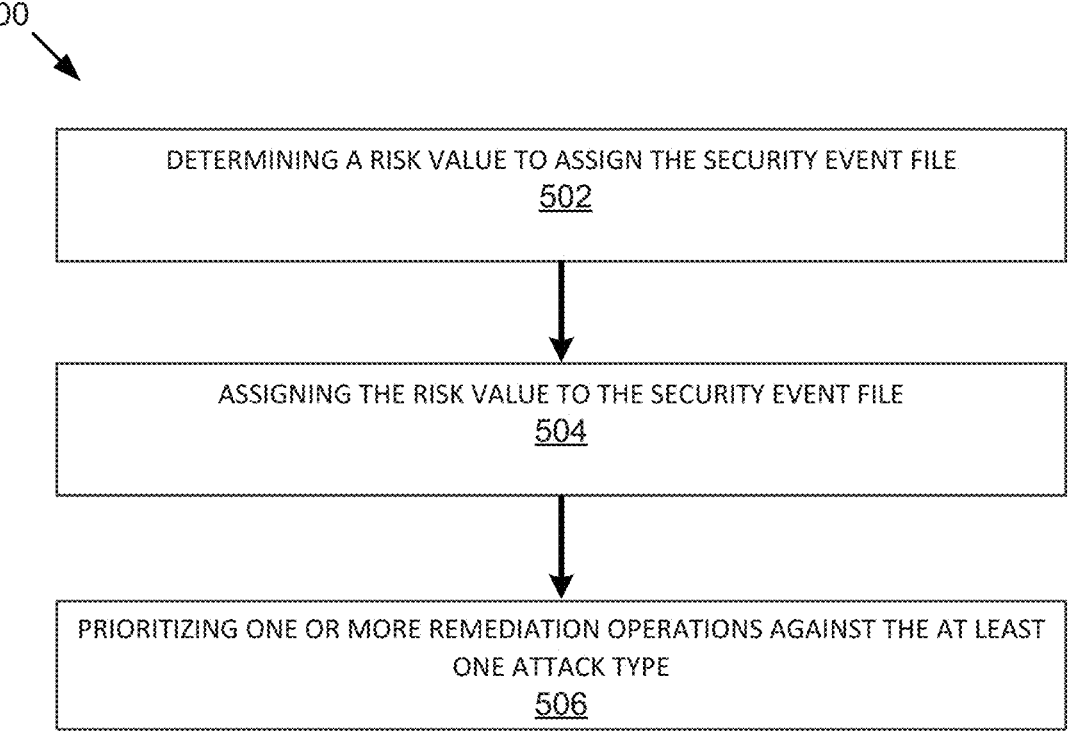
FIG. 5 shows an example flowchart for prioritizing remediation operations, in accordance with some embodiments of this disclosure.

The security event file discussed in association with step 406 of FIG. 4 may comprise at least one attack type, such that executing one or more security tests for the security event file using the decision tree comprises: determining a risk value to assign the security event file, assigning the risk value to the security event file, and prioritizing one or more remediation operations against the at least one attack type as shown at steps 502-506 of FIG. 5. In some cases, the risk value indicates the severity of the attack type associated with the security event file. For example, a risk value of 10 may indicate a high severity of the attack type associated with the security event file while an attack type having a risk value of about 1 may indicate a low severity of the attack type associated with the security event file. Moreover, a risk value of the security event file may be used to customize or otherwise adapt remediation strategies against one or more attack steps or attack execution operations associated with the attack type comprised in the security event file.

In one embodiment, the nodal data may include a first nodal data that comprises a first score assigned to a first leaf node (e.g., node "b" or node "c", etc.) comprised in the plurality of second nodes of the decision tree, such that the first score includes a combination of: a second score associated with a second leaf node comprised in the plurality of second nodes of the decision tree, and a third score associated with a third leaf node comprised in the plurality of second nodes of the decision tree.

The threat attribute data may further comprise one or more of: a seventh threat attribute associated with the plurality of attack execution operations. The seventh threat attribute may comprise application package data indicative of package-access information associated with executing at least one attack execution operation comprised in the plurality of attack execution operations. The threat attribute data may also comprise an eighth threat attribute associated with the plurality of attack execution operations. The eighth threat attribute may comprise sub-operation data associated with executing at least one sub-attack execution operation associated with at least one attack execution operation comprised in the plurality of attack execution operations discussed in association with step 402 above. The threat attribute data may also comprise a ninth threat attribute associated with the plurality of attack execution operations. The ninth threat attribute may comprise remediation data associated with mitigating against at least one attack execution operation comprised in the plurality of attack execution operations. It is appreciated that in some embodiments, the decision tree is generated based on the seventh threat attribute, the eighth threat attribute, and the ninth threat attribute in addition to/without the first threat attribute, the second threat attribute, the third threat attribute, the fourth threat attribute, the fifth threat attribute, and the sixth threat attribute.

In some cases, the threat attribute data is used to automatically structure one or more parent nodes and child nodes of the decision tree. Furthermore, the attack data comprises one or more of: a framework based on an attack repository; the attack repository comprising one or more of the attacker or one or more attackers associated with the plurality of attack execution operations; attack data captured from multiple computing devices associated with multiple entities; and one or more resources associated with the multiple computing devices.

Furthermore, the malware data discussed in association with FIG. 4 may comprise a group of malware samples that have a common code base. The user data may comprise user credential data or administrator credential data. The location data may comprise data that indicates whether at least one attack execution operation was locally executed or remotely executed relative to a location of one or more computing devices upon which an attack by a threat-actor was launched.

Moreover, the first nodal data may be based on a grouping of a plurality of threat attributes correlated to threat tactics, threat techniques, or threat procedures associated with a framework (e.g., MITRE ATT&CK framework) from which the threat data or attack data was pulled. In addition, the decision tree may automatically balance threat attributes across different tactics associated with the framework to generate an attack kill-chain associated with the security event file. The attack kill-chain may indicate one or more attack execution operations for executing an attack campaign such that the one or more security tests conducted on the security event file using the decision tree may generate remediation data comprising security operations that mitigate against the attack kill-chain. In particular, the decision tree may be used to customize or otherwise adapt specific and effective remediation steps or remediation operations against the attack kill-chain. In some embodiments, the decision tree maps threat tactics, threat techniques, and threat practices associated with the framework to one or more scores assigned to one or more nodes of the decision tree.

In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to interfaces and particular hardware. However, the present disclosure applies to any type of computing device that can receive data and commands, and any devices providing security services.

Reference in the specification to "one implementation" or "an implementation" or "one embodiment" or "some embodiments" means that a particular feature, structure, or characteristic described in connection with the implementation/embodiment is included in at least one implementation of the disclosure. The appearances of the phrase "in one implementation/embodiment" or "in some implementations/embodiments" in various places in the specification are not necessarily all referring to the same implementation/embodiment.

Some portions of the detailed descriptions above are presented in terms of algorithms, modules, and symbolic representations of operations on data bits within a computer memory. These descriptions and representations are the means used by those skilled in data processing arts to most effectively convey the substance of their work to others skilled in the art.

The present disclosure also relates to an apparatus for performing the operations disclosed. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In some implementations, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A method comprising:

receiving, using one or more computing device processors, first attack data comprising a plurality of attack execution operations;

determining, using the one or more computing device processors, threat attribute data based on the first attack data, the threat attribute data comprising at least four of:

a first threat attribute associated with the plurality of attack execution operations, the first threat attribute comprising threat-actor data based on an attacker associated with at least one attack execution operation comprised in the plurality of attack execution operations, a second threat attribute associated with the plurality of attack execution operations, the second threat attribute based on malware data associated with the at least one attack execution operation comprised in the plurality of attack execution operations, a third threat attribute associated with the plurality of attack execution operations, the third threat attribute based on security tool data associated with the at least one attack execution operation comprised in the plurality of attack execution operations, a fourth threat attribute associated with the plurality of attack execution operations, the fourth threat attribute based on user data associated with the at least one attack execution operation comprised in the plurality of attack execution operations, a fifth threat attribute associated with the plurality of attack execution operations, the fifth threat attribute based on location data associated with the at least one attack execution operation comprised in the plurality of attack execution operations, or a sixth threat attribute associated with the plurality of attack execution operations, the sixth threat attribute based on operating system data associated with the at least one attack execution operation comprised in the plurality of attack execution operations;

generating or accessing, using the one or more computing device processors, a decision tree using the threat attribute data, the decision tree including at least one first node and at least one second node connected to the at least one first node, wherein: first nodal data is generated and associated with the at least one second node based on at least one of the first threat attribute, the second threat attribute, the third threat attribute, the fourth threat attribute, the fifth threat attribute, or the sixth threat attribute;

receiving, using the one or more computing device processors, security event data; and executing one or more security computing operations, using the decision tree, based on, for, or using the security event data.

2. The method of claim 1, wherein:

the security event data comprises at least one attack type, and the executing the one or more security computing operations, using the decision tree, based on, for, or using the security event data comprises at least one of:

determining a risk value to assign to the security event data, and assigning the risk value to the security event data, or prioritizing one or more remediation operations against the at least one attack type.

3. The method of claim 1, wherein the first nodal data comprises or is associated with a first score or value assigned to a first leaf node comprised in the at least one second node of the decision tree, the first score or value including or being based on at least one of:

a second score or value associated with a second leaf node comprised in the at least one second node of the decision tree, or a third score or value associated with a third leaf node comprised in the at least one second node of the decision tree.

4. The method of claim 1, wherein the threat attribute data further comprises one or more of:

a seventh threat attribute associated with the plurality of attack execution operations, the seventh threat attribute comprising application package data based on package-access information associated with the at least one attack execution operation comprised in the plurality of attack execution operations, an eighth threat attribute associated with the plurality of attack execution operations, the eighth threat attribute based on sub-operation data associated with at least one sub-attack execution operation associated with the at least one attack execution operation comprised in the plurality of attack execution operations, or a ninth threat attribute associated with the plurality of attack execution operations, the ninth threat attribute based on remediation data associated with mitigating against the at least one attack execution operation comprised in the plurality of attack execution operations.

5. The method of claim 1, wherein the threat attribute data is used to automatically structure one or more parent nodes or child nodes of the decision tree.

6. The method of claim 1, wherein the first attack data comprises one or more of:

framework data based on or associated with an attack repository, the attack repository based on one or more of the attacker or one or more attackers associated with the plurality of attack execution operations or associated with a plurality of second attack execution operations, second attack data captured from or associated with multiple computing devices associated with multiple entities, or one or more resources associated with the multiple computing devices.

7. The method of claim 6, wherein at least one of:

the malware data comprises malware sample data associated with a code base, the user data comprises user credential data or administrator credential data, or the location data indicates whether the at least one attack execution operation was locally executed or remotely executed relative to at least one location of the multiple computing devices.

8. The method of claim 6, wherein the first nodal data is based on second threat attribute data correlated to or associated with at least one of a threat tactic, a threat technique, or a threat procedure associated with the framework data.

9. The method of claim 6, wherein:

the decision tree automatically balances threat attributes across different tactics associated with the framework data to generate an attack kill-chain associated with the security event data, the attack kill-chain indicates one or more attack execution operations for executing an attack campaign, and the one or more security computing operations using the decision tree generates remediation data based on one or more security operations that mitigate against the attack kill-chain.

10. The method of claim 6, wherein the decision tree maps one or more of a threat tactic, a threat technique, and a threat practice associated with the framework data to one or more scores or values assigned to one or more nodes of the decision tree.

11. The method of claim 1, wherein: the determining, using the one or more computing device processors, the threat attribute data based on the first attack data, the threat attribute data comprising at least four of:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on the location data associated with the at least one attack execution operation comprised in the plurality of attack execution operations, or the sixth threat attribute associated with the plurality of attack execution operations, the sixth threat attribute based on the operating system data associated with executing the at least one attack execution operation comprised in the plurality of attack execution operations, comprises at least five of:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on the location data associated with the at least one attack execution operation comprised in the plurality of attack execution operations, or the sixth threat attribute associated with the plurality of attack execution operations, the sixth threat attribute based on the operating system data associated with executing the at least one attack execution operation comprised in the plurality of attack execution operations.

12. The method of claim 1, wherein: the determining, using the one or more computing device processors, the threat attribute data based on the first attack data, the threat attribute data comprising at least four of:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on comprising the location data associated with the at least one attack execution operation comprised in the plurality of attack execution operations, or the sixth threat attribute associated with the plurality of attack execution operations, the sixth threat attribute based on the operating system data associated with executing the at least one attack execution operation comprised in the plurality of attack execution operations, comprises:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on the location data associated with the at least one attack execution operation comprised in the plurality of attack execution operations, and the sixth threat attribute associated with the plurality of attack execution operations, the sixth threat attribute based on the operating system data associated with the executing the at least one attack execution operation comprised in the plurality of attack execution operations.

13. One or more systems comprising:

one or more computing system processors; and memory storing instructions that, when executed by the one or more computing system processors, causes the one or more systems to:

receive first attack data comprising a plurality of attack execution operations, determine threat attribute data based on the first attack data, the threat attribute data comprising at least four of:

a first threat attribute associated with the plurality of attack execution operations, the first threat attribute comprising threat-actor data based on an attacker associated with at least one attack execution operation comprised in the plurality of attack execution operations, a second threat attribute associated with the plurality of attack execution operations, the second threat attribute based on malware data associated with the at least one attack execution operation comprised in the plurality of attack execution operations, a third threat attribute associated with the plurality of attack execution operations, the third threat attribute based on security tool data associated with the at least one attack execution operation comprised in the plurality of attack execution operations, a fourth threat attribute associated with the plurality of attack execution operations, the fourth threat attribute based on user data associated with the at least one attack execution operation comprised in the plurality of attack execution operations, a fifth threat attribute associated with the plurality of attack execution operations, the fifth threat attribute based on location data associated with the at least one attack execution operation comprised in the plurality of attack execution operations, or a sixth threat attribute associated with the plurality of attack execution operations, the sixth threat attribute based on operating system data associated with the at least one attack execution operation comprised in the plurality of attack execution operations;

generate or access a decision tree using the threat attribute data, the decision tree including at least one first node and at least one second node connected to the at least one first node, wherein: first nodal data is generated and associated with the at least one second node based on at least one of the first threat attribute, the second threat attribute, the third threat attribute, the fourth threat attribute, the fifth threat attribute, or the sixth threat attribute;

receive security event data; and execute one or more security computing operations, using the decision tree, based on, for, or using the security event data.

14. The one or more systems of claim 13, wherein the security event data comprises at least one attack type, and wherein the executing the one or more security computing operations, using the decision tree, based on, for, or using the security event data comprises at least one of:

determining a risk value to assign the security event data, assigning the risk value to the security event data, or prioritizing one or more remediation operations against the at least one attack type.

15. The one or more systems of claim 13, wherein the first nodal data comprises a first score assigned to a first leaf node comprised in the at least one second node of the decision tree, the first score or value including or being based on at least one of:

a second score associated with a second leaf node comprised in the at least one second node of the decision tree, or a third score associated with a third leaf node comprised in the at least one second node of the decision tree.

16. The one or more systems of claim 13, wherein the threat attribute data further comprises one or more of:

a seventh threat attribute associated with the plurality of attack execution operations, the seventh threat attribute comprising application package data based on package-access information associated with executing the at least one attack execution operation comprised in the plurality of attack execution operations, an eighth threat attribute associated with the plurality of attack execution operations, the eighth threat attribute based on sub-operation data associated with executing at least one sub-attack execution operation associated with the at least one attack execution operation comprised in the plurality of attack execution operations, or a ninth threat attribute associated with the plurality of attack execution operations, the ninth threat attribute based on remediation data associated with mitigating against the at least one attack execution operation comprised in the plurality of attack execution operations.

17. The one or more systems of claim 13, wherein the threat attribute data is used to automatically structure one or more parent nodes and child nodes of the decision tree.

18. The one or more systems of claim 13, wherein the first attack data comprises one or more of:

a framework based on an attack repository, the attack repository based on one or more of the attacker or one or more attackers associated with the plurality of attack execution operations, or second attack data captured from multiple computing devices associated with multiple entities.

19. The one or more systems of claim 18, wherein at least one of:

the malware data comprises a group of malware samples that have a common code base, the user data comprises user credential data or administrator credential data, or the location data indicates whether the at least one attack execution operation was locally executed or remotely executed relative to a location of the multiple computing devices.

20. The one or more systems of claim 18, wherein the first nodal data is based on second threat attribute data correlated to or associated with at least one of a threat tactic, a threat technique, or a threat procedure associated with the framework.

21. The one or more systems of claim 18, wherein:

the decision tree automatically balances threat attributes across different tactics associated with the framework to generate an attack kill-chain associated with the security event data, the attack kill-chain indicates one or more attack execution operations for executing an attack campaign, and the one or more security computing operations using the decision tree generates remediation data comprising one or more security operations that mitigate against the attack kill-chain.

22. A method comprising:

receiving, using one or more computing device processors, attack data comprising a plurality of attack execution operations;

determining, using the one or more computing device processors, threat attribute data based on the attack data, the threat attribute data comprising at least four or three of:

a first threat attribute associated with the plurality of attack execution operations, the first threat attribute comprising threat-actor data based on an attacker associated with at least one attack execution operation comprised in the plurality of attack execution operations, a second threat attribute associated with the plurality of attack execution operations, the second threat attribute based on malware data associated with the at least one attack execution operation comprised in the plurality of attack execution operations, a third threat attribute associated with the plurality of attack execution operations, the third threat attribute based on security tool data associated with the at least one attack execution operation comprised in the plurality of attack execution operations, a fourth threat attribute associated with the plurality of attack execution operations, the fourth threat attribute based on user data associated with the at least one attack execution operation comprised in the plurality of attack execution operations, a fifth threat attribute associated with the plurality of attack execution operations, the fifth threat attribute based on location data associated with the at least one attack execution operation comprised in the plurality of attack execution operations, or a sixth threat attribute associated with the plurality of attack execution operations, the sixth threat attribute based on operating system data associated with the at least one attack execution operation comprised in the plurality of attack execution operations;

generating or accessing, using the one or more computing device processors, a decision tree using the threat attribute data, the decision tree including at least one first node and at least one second node connected to the at least one first node, wherein:

first nodal data is generated and associated with the at least one second node based on at least one of the first threat attribute, the second threat attribute, the third threat attribute, the fourth threat attribute, the fifth threat attribute, or the sixth threat attribute;

receiving, using the one or more computing device processors, security event data; and executing one or more security computing operations, using the decision tree, based on, for, or using the security event data.

23. The method of claim 22, wherein: the determining, using the one or more computing device processors, the threat attribute data based on the attack data, the threat attribute data comprising at least four or three of:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on comprising the location data associated with the at least one attack execution operation comprised in the plurality of attack execution operations, or the sixth threat attribute associated with the plurality of attack execution operations, the sixth threat attribute based on the operating system data associated with executing the at least one attack execution operation comprised in the plurality of attack execution operations, comprises at least five of:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on the location data associated with the at least one attack execution operation comprised in the plurality of attack execution operations, or the sixth threat attribute associated with the plurality of attack execution operations, the sixth threat attribute based on the operating system data associated with the executing the at least one attack execution operation comprised in the plurality of attack execution operations.

24. The method of claim 22, wherein: the determining, using the one or more computing device processors, the threat attribute data based on the attack data, the threat attribute data comprising at least four or three of:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on the location data associated with the at least one attack execution operation comprised in the plurality of attack execution operations, or the sixth threat attribute associated with the plurality of attack execution operations, the sixth threat attribute based on the operating system data associated with executing the at least one attack execution operation comprised in the plurality of attack execution operations, comprises:

the first threat attribute associated with the plurality of attack execution operations, the first threat attribute comprising the threat-actor data based on the attacker associated with the at least one attack execution operation comprised in the plurality of attack execution operations, the second threat attribute associated with the plurality of attack execution operations, the second threat attribute based on the malware data associated with the at least one attack execution operation comprised in the plurality of attack execution operations, the third threat attribute associated with the plurality of attack execution operations, the third threat attribute based on the security tool data associated with the at least one attack execution operation comprised in the plurality of attack execution operations, the fourth threat attribute associated with the plurality of attack execution operations, the fourth threat attribute based on the user data associated with the at least one attack execution operation comprised in the plurality of attack execution operations, the fifth threat attribute associated with the plurality of attack execution operations, the fifth threat attribute based on the location data associated with the at least one attack execution operation comprised in the plurality of attack execution operations, and the sixth threat attribute associated with the plurality of attack execution operations, the sixth threat attribute based on the operating system data associated with the executing the at least one attack execution operation comprised in the plurality of attack execution operations.

*   *   *   *   *